United States Patent
Kim et al.

(10) Patent No.: US 9,928,459 B2
(45) Date of Patent: Mar. 27, 2018

(54) ROBOTIC CLEANER AND SELF TESTING METHOD OF THE SAME

(75) Inventors: Siyong Kim, Changwon-si (KR);
Yongju Kim, Changwon-si (KR);
Jihoon Sung, Changwon-si (KR);
Hyungtae Yun, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1235 days.

(21) Appl. No.: 13/536,317

(22) Filed: Jun. 28, 2012

(65) Prior Publication Data
US 2013/0030750 A1 Jan. 31, 2013

(30) Foreign Application Priority Data

Jul. 25, 2011 (KR) .................. 10-2011-0073795
Jul. 25, 2011 (KR) .................. 10-2011-0073796
Jul. 25, 2011 (KR) .................. 10-2011-0073799

(51) Int. Cl.
*G01L 25/00* (2006.01)
*G06N 3/00* (2006.01)
*A47L 9/28* (2006.01)

(52) U.S. Cl.
CPC ............ *G06N 3/004* (2013.01); *A47L 9/2805* (2013.01); *A47L 9/2857* (2013.01)

(58) Field of Classification Search
CPC ...................................................... G06N 3/004
See application file for complete search history.

(56) References Cited

U.S. PATENT DOCUMENTS

| 7,332,890 | B2 * | 2/2008 | Cohen .............. A47L 9/2857 320/109 |
| 7,389,166 | B2 * | 6/2008 | Harwig ............. G05D 1/0272 15/300.1 |
| 2005/0204505 | A1 * | 9/2005 | Kashiwagi ......... G05D 1/0246 15/319 |
| 2007/0096675 | A1 * | 5/2007 | Kim .................. G05D 1/0225 318/587 |
| 2008/0065266 | A1 * | 3/2008 | Kim .................. G05D 1/0225 700/245 |
| 2008/0133054 | A1 * | 6/2008 | Kim .................... A47L 9/009 700/245 |
| 2009/0143913 | A1 * | 6/2009 | Kim ..................... B25J 9/1674 700/259 |
| 2009/0157227 | A1 * | 6/2009 | Park .................. G05D 1/027 700/258 |

(Continued)

FOREIGN PATENT DOCUMENTS

| EP | 1936463 A2 * | 6/2008 |  |
| GB | 2394796 A * | 5/2004 | ........... A47L 9/2805 |
| JP | 2005-218560 A | 8/2005 |  |

(Continued)

*Primary Examiner* — Hyun Park
(74) *Attorney, Agent, or Firm* — Dentons US LLP

(57) ABSTRACT

Disclosed are a robot cleaner and a self testing method thereof. The robot cleaner performs a self test when being initially operated or when required by a user. This may prevent malfunctions or breakdowns of the robot cleaner. Furthermore, the robot cleaner senses a state of an operation sensing unit provided at a body, based on a sensing signal of the operation sensing unit. This may prevent accidents or errors which may occur as the robot cleaner operates.

20 Claims, 14 Drawing Sheets

(56) References Cited

U.S. PATENT DOCUMENTS

| | | | | |
|---|---|---|---|---|
| 2010/0324773 A1* | 12/2010 | Choi | ............... | G05D 1/0246 |
| | | | | 701/26 |
| 2011/0166763 A1* | 7/2011 | Choi | ............ | G05D 1/027 |
| | | | | 701/82 |

FOREIGN PATENT DOCUMENTS

| KR | 10-2006-0127452 A | 12/2006 |
|---|---|---|
| KR | 10-2007-0018641 A | 2/2007 |
| KR | 10-0767120 B1 | 10/2007 |
| KR | 10-2009-0043088 A | 5/2009 |
| KR | 10-2009-0069595 A | 7/2009 |

* cited by examiner

ROBOTIC CLEANER AND SELF TESTING METHOD OF THE SAME

CROSS-REFERENCE TO RELATED APPLICATION

This application claims the benefit of Korean Patent Application Nos. 10-2011-0073795, filed on Jul. 25, 2011, 10-2011-0073796, filed on Jul. 25, 2011, and 10-2011-0073799, filed on Jul. 25, 2011 which are hereby incorporated by reference for all purposes as if fully set forth herein.

BACKGROUND

1. Field of the Disclosure

The present disclosure relates to a robot cleaner capable of performing a self test operation, and a self testing method thereof.

2. Background of the Disclosure

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials with autonomously moving on a predetermined region. This robot cleaner is provided with a chargeable battery, and is provided with an obstacle sensor for avoiding an obstacle while moving.

A method for controlling the robot cleaner may include a method using a remote controller, a user interface, a method using a button provided at a body of the robot cleaner, etc.

Recently, applied techniques using the robot cleaner are being developed. For instance, a robot cleaner having a networking function is being developed. This may allow a cleaning command to be instructed from a remote place, or home situations to be monitored. Furthermore, being developed robot cleaners having a map creating function and a self position recognition function using a camera or each sensor.

SUMMARY OF THE DISCLOSURE

Therefore, an aspect of the detailed description is to provide a robot cleaner capable of performing a self test operation when being initially operated or when required by a user, and a self testing method of the same.

Another aspect of the detailed description is to provide a robot cleaner capable of testing a state of an operation sensing unit provided at a body based on a sensing signal of the operation sensing unit when being initially operated or when required by a user, and a self testing method of the same.

To achieve these and other advantages and in accordance with the purpose of this specification, as embodied and broadly described herein, there is provided a robot cleaner, comprising: a body which forms an appearance, a driving unit having a wheel motor to rotate a main wheel, and to move the body by driving the wheel motor, a storage unit to store a test algorithm corresponding to a test mode, an operation sensing unit to sense an operation of the robot cleaner which changes according to a movement of the body, and to output sensing information, a controller to execute the test algorithm to test a state of the operation sensing unit based on the sensing information, and an output unit to output a test result of the operation sensing unit.

The robot cleaner may further comprise an input unit configured to input an execution command with respect to a self test mode. The controller may be configured to execute the test algorithm according to the execution command, and to test a state of the operation sensing unit.

According to another aspect of the present disclosure, there is provided a robot cleaner comprising: a body which forms an appearance, a driving unit having a wheel motor to rotate a main wheel, and to move the body by driving the wheel motor, a cleaning unit installed at the body to suck foreign materials or dust particles into the cleaning unit, a storage unit to store a test algorithm corresponding to a test mode, one or more object sensing units provided at the body to output sensing information by sensing an object, a controller to execute the test algorithm to test a state of the one or more object sensing units based on the sensing information, and an output unit to output a test result of the one or more object sensing unit.

The robot cleaner may further comprise an input unit configured to input an execution command with respect to a self test mode. The controller may be configured to execute the test algorithm according to the execution command, and to test a state of the operation sensing unit.

The present disclosure may have the following advantages.

Firstly, the robot cleaner may perform a self test operation when being initially operated or when required by a user. This may prevent malfunctions occurring while the robot cleaner performs a cleaning operation or a running operation.

Secondly, the robot cleaner may perform a self test operation by sensing states of components and sensors thereof. This may enhance the stability of a system.

Thirdly, the robot cleaner may test a state of the operation sensing unit provided at the body based on a sensing signal of the operation sensing unit when being initially operated or when required by a user. This may prevent errors or malfunctions of the operation sensing unit, enhance a driving efficiency of the robot cleaner, and enhance a user's safety and convenience.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 2:
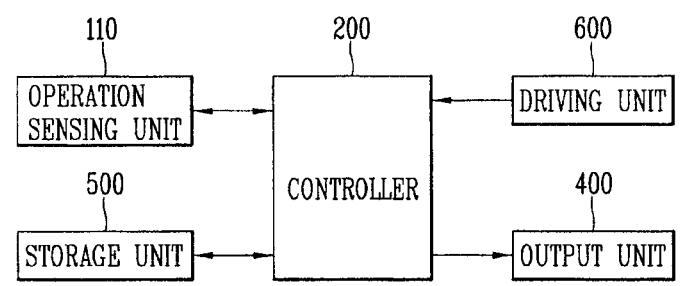
FIGS. 2 to 5 are block diagrams showing a configuration of robot cleaners according to embodiments of the present disclosure.

Referring to FIG. 2, a robot cleaner according to one embodiment of the present disclosure comprises a body which forms the appearance, a driving unit 600, storage unit 500, an operation sensing unit 110, a controller 200 and an output unit 400. The driving unit 600 has a wheel motor for rotating a main wheel 610, and is configured to move the body by driving the wheel motor. The storage unit 500 stores a test algorithm corresponding to a test mode. The operation sensing unit 110 is configured to sense an operation of the robot cleaner which changes according to a movement of the body, and to output sensing information; The controller 200 is configured to execute the test algorithm to test a state of the operation sensing unit based on the sensing information. The output unit 400 is configured to output a test result of the operation sensing unit.

The controller 200 is configured to check one or more preset execution conditions before executing the self test mode. Here, the preset execution conditions for a self test mode include a mounted state of a dust box, an attached state of a dustcloth plate, a battery state, etc.

Figure 3:
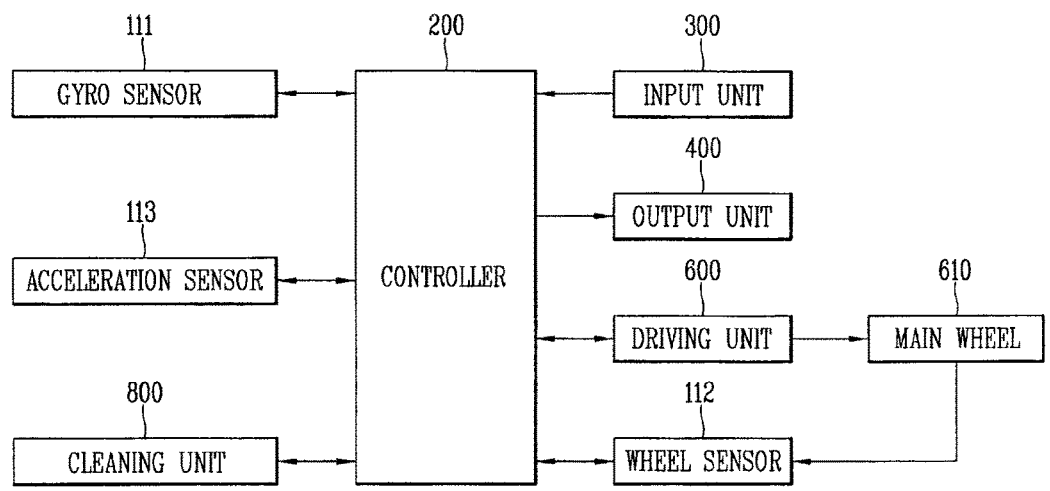

Referring to FIG. 3, the robot cleaner according to one embodiment of the present disclosure further comprises an input unit 300 configured to input an execution command with respect to a self test mode. The controller 200 is configured to test a state of the operation sensing unit by executing the test algorithm according to the execution command. A user may input a control command to the robot cleaner directly through the input unit 300. And, the user may input, through the input unit 300, a command instructing an output of one or more information among information stored in a storage unit. The input unit 300 may be implemented as one or more buttons. For instance, the input unit 300 may include an OK button and a set button. The OK button is used to input a command for certifying sensing information, obstacle information, position information, and a cleaning region or a cleaning map. The set button is used to input a command for setting the information. The input unit may be provided with a reset button for inputting a command for resetting the information, a deletion button, a cleaning start button, a stop button, etc. As another example, the input unit 300 may be provided with a button for setting reservation information, or a button for deleting reservation information. The input unit 300 may be further provided with a button for setting a cleaning mode, or a button for changing a cleaning mode. The input unit 300 may be further provided with a button for inputting a command instructing the robot cleaner to return to a charging base.

Figure 1:
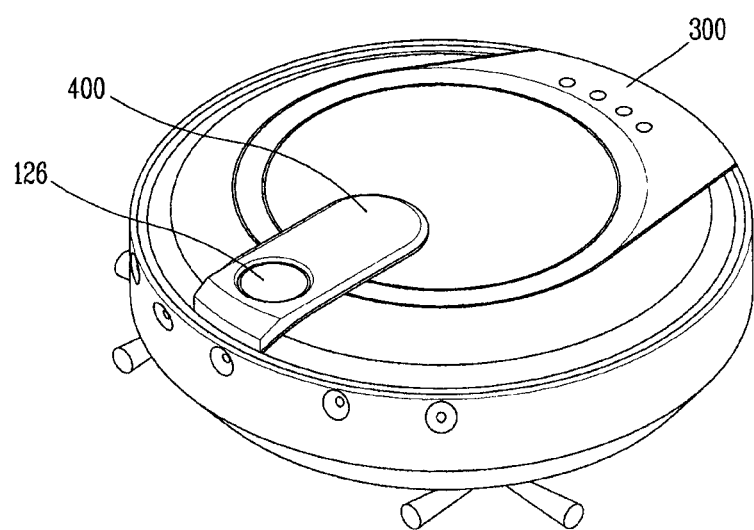
FIG. 1 is a perspective view showing the appearance of a robot cleaner according to one embodiment of the present disclosure.

As shown in FIG. 1, the input unit 300 may be installed at an upper part of the robot cleaner, in the form of hard or soft keys, a touch pad, etc. The input unit 300 may be implemented in the form of a touch screen together with the output unit. The input unit 300 is configured to input commands instructing start, end, stop, release, etc. of a self test mode. A user may input a command instructing the robot cleaner to enter a self test mode, by pressing one of the buttons installed at the robot cleaner, or by pressing the buttons in a constant form, or by pressing one button for a predetermined time. As another example, the user may input an execution command of a self test mode to the robot cleaner by generating a control signal with using a remote controller, a terminal, etc. In this case, the robot cleaner further comprises a sensor or a communication means for receiving a control signal. Furthermore, the input unit 300 may set or input a test object, a test method, a test order, etc.

Figure 10:
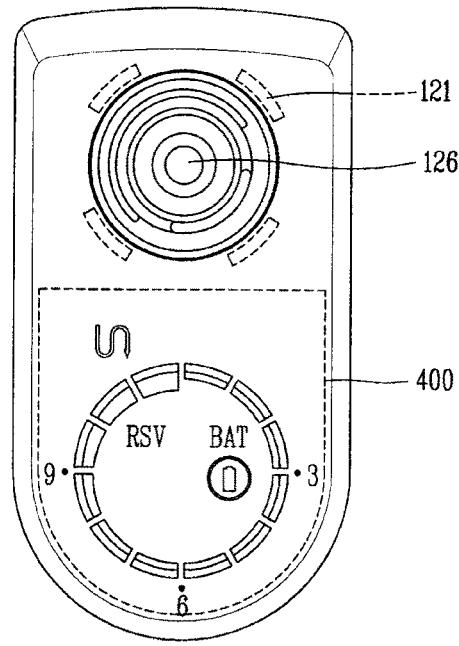
FIG. 10 is an enlarged view of an output unit of a robot cleaner according to one embodiment of the present disclosure.

As shown in FIG. 1, the output unit 400 is installed at an upper part of the robot cleaner. However, the installation position may be variable in a different form. For instance, as shown in FIG. 10, the output unit 400 outputs, to a screen, reservation information, a battery state, an intensive cleaning, a space extension, and a cleaning or running operation in a zigzag form. The output unit 400 may output an inner state of the robot cleaner sensed by a sensing unit 100, e.g., current statues of units of the robot cleaner, and a current cleaning state. Here, the sensing unit 100 includes an operation sensing unit 110, an object sensing unit 120, and a state sensing unit 130. The output unit 400 may display, on a screen, external information sensed by the sensing unit 100, obstacle information, position information, a cleaning region, a cleaning map, etc. The output unit 400 may be implemented as one of a light emitting diode (LED), a liquid crystal display (LCD), a plasma display panel (PDP), and an organic light emitting diode (OLED).

The output unit 400 may further include a sound output means configured to output an execution result of a self test mode in the form of sound. For instance, the output unit 400 may output an alarm sound to the outside according to an alarm signal. The sound output means includes a beeper, a speaker, etc. The output unit 400 may output a test result to the outside based on audio information stored in a storage unit to be later explained.

The storage unit 500 may store individual algorithms according to a test object, a test method, etc., or may store an entire test algorithm in advance. The storage unit 500 may store audio information for outputting a state and a test result of the robot cleaner to the outside. That is, the storage unit 500 pre-stores a state of the robot cleaner, an execution result of a self test mode, etc. by patterning in the form of text data or audio data. The output unit 400 signal-processes audio information stored in the storage unit by a signal processor provided thereat, and outputs the signal-processed audio information to the outside through the sound output means.

The storage unit 500 is configured to store therein a control program for controlling the robot cleaner, and relevant data. The storage unit 500 may be configured to further store therein image information, obstacle information, position information, a cleaning region, a cleaning map, etc., as well as audio information. And, the storage unit 500 may store a cleaning type, a running type, etc. therein. As the storage unit 500, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical drive, a magnetic RAM, a PRAM, etc.

Referring to FIG. 3, the operation sensing unit 110 includes at least one of a gyro sensor 111, a wheel sensor 112 and an acceleration sensor 113, thereby sensing an operation of the robot cleaner.

The gyro sensor 111 is configured to sense a rotation direction and a rotation angle when the robot cleaner moves according to an operation mode. The gyro sensor 111 senses an angular speed of the robot cleaner, and outputs a voltage proportional to the angular speed. The controller 200 calculates a rotation direction and a rotation angle of the robot cleaner based on the voltage outputted from the gyro sensor.

The wheel sensors 112 are connected to right and left main wheels 610, thereby sensing RPMs of the right and left main wheels 610. The wheel sensor 112 may be implemented as a rotary encoder. When the robot cleaner moves in a running mode or a cleaning mode, the rotary encoder senses RPMs of the right and left main wheels, and outputs the sensed RPMs. The wheel sensors 112 may comprise right and left wheel sensors. The controller may calculate rotation speeds of the right and left main wheels based on the sensed RPMs. In a self test mode, the controller 200 controls the robot cleaner to move with a reference speed, and compares a speed of the robot cleaner calculated based on an output value of the wheel sensors, with the reference speed. The controller tests whether the main wheels are in an abnormal state based on a comparison result. Alternatively, the controller tests whether the right and left main wheels are in an abnormal state based on a difference of RPMs or rotation speeds of the right and left main wheels. If the main wheel is in an abnormal state, the output unit 400 may output a voice message such as "Please check foreign materials of the left main wheel." or "Please check foreign materials of the right main wheel." Alternatively, the output unit 400 may display the message on a screen.

The controller 200 may calculate a rotation angle of the robot cleaner based on a difference of RPMs of the right and left main wheels. And, the controller compares a rotation angle calculated based on an output value of the wheel sensors 112, with a rotation angle outputted from the gyro sensor 111, and tests whether the gyro sensor 111 is in an abnormal state based on a comparison result. In a self test mode, the controller rotates the robot cleaner by 180° to the right or left direction based on the charging base or a reference position according to a test algorithm. Then, the controller calculates a rotation angle based on an output value of the wheel sensors, and senses a rotation angle by the gyro sensor. Then, the controller compares the calculated rotation angle with the sensed rotation angle. For instance, when a difference of the rotation angles is more than a predetermined angle, e.g., 30°, the controller 200 determines that the gyro sensor is in an abnormal state. If the gyro sensor is in an abnormal state, the output unit 400 may output a voice message such as "The gyro sensor is in an abnormal state." or "Please try to execute a test mode after turning off a main power switch disposed at a lower part of the body, and then turning on.", or "Please call the service center if the same problems are repeated." Alternatively, the output unit 400 may display the message on a screen.

The acceleration sensor 113 is configured to sense a speed change of the robot cleaner due to a start operation, a stop operation, a direction change, collision with an object, etc. The acceleration sensor may be attached to a region adjacent to a main wheel or an auxiliary wheel, thereby sensing sliding or idling of the wheel. Here, the controller 200 may calculate a speed of the robot cleaner based on an acceleration sensed by the acceleration sensor. Then, the controller 200 may sense a position of the robot cleaner or may compensate for the sensed position of the robot cleaner by comparing the calculated speed with a reference speed. In the present disclosure, the acceleration sensor is mounted in the controller 200, and senses a speed change of the robot cleaner occurring in a cleaning mode or a running mode. That is, the acceleration sensor senses an impact amount due to a speed change, and outputs a voltage corresponding to the impact amount. Accordingly, the acceleration sensor may perform functions of an electronic bumper.

The acceleration sensor 113 is configured to consecutively sense the floor while the robot cleaner moves. Once a self test mode is executed, the controller 200 compares an output value from the acceleration sensor with a reference value. Then, the controller 200 tests the acceleration sensor based on a comparison result. In the self test mode, the controller 200 controls the robot cleaner to move in a predetermined pattern according to a test algorithm. If the acceleration sensor outputs a value more than a reference value, the controller 200 determines that the acceleration sensor is in an abnormal state. If the acceleration sensor is in an abnormal state, the output unit 400 may output a voice message such as "The acceleration sensor is in an abnormal state." or "Please try to execute a test mode after turning off a main power switch disposed at a lower part of the body, and then turning on.", or "Please call the service center if the same problems are repeated.". Alternatively, the output unit 400 may display the message on a screen.

The robot cleaner according to one embodiment of the present disclosure further comprises an object sensing unit configured to sense a peripheral object. The object sensing unit includes at least one of an external signal sensor, a front sensor, an obstacle sensor, a cliff sensor, a lower camera sensor, and an upper camera sensor.

Figure 4:
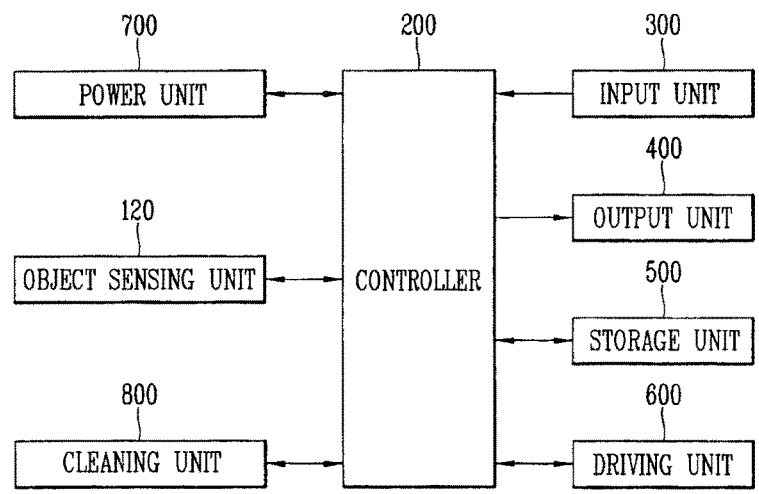

Referring to FIG. 4, a robot cleaner according to another embodiment of the present disclosure comprises a body which forms the appearance, a driving unit 600, cleaning unit 800, storage unit 500, one or more object sensing units 120, a controller 200 and an output unit 400. The driving unit 600 has a wheel motor to rotate a main wheel, and moves the body by driving the wheel motor. The cleaning unit 800 is installed at the body to suck foreign materials or dust particles into the cleaning unit. The storage unit 500 stores a test algorithm corresponding to a test mode. The one or more object sensing units are provided at the body to output sensing information by sensing an object. The controller 200 executes the test algorithm to test a state of the one or more object sensing units based on the sensing information. The output unit 400 outputs a test result of the one or more object sensing unit.

Referring to FIG. 4, the robot cleaner according to one embodiment of the present disclosure further comprises an input unit 300 configured to input an execution command with respect to a self test mode. The controller 200 is configured to test a state of the operation sensing unit by executing the test algorithm according to the execution command.

As shown in FIG. 1, the input unit 300 may be installed at an upper part of the robot cleaner, in the form of hard or soft keys, a touch pad, etc. The input unit 300 may be implemented in the form of a touch screen together with the output unit. The input unit 300 is configured to input commands instructing start, end, stop, release, etc. of a self test mode. A user may input a command instructing the robot cleaner to enter a self test mode, by pressing one of the buttons installed at the robot cleaner, or by pressing the buttons in a constant form, or by pressing one button for a predetermined time. As another example, the user may input an execution command of a self test mode to the robot cleaner by generating a control signal with using a remote controller, a terminal, etc. In this case, the robot cleaner further comprises a sensor or a communication means for receiving a control signal. Furthermore, the input unit 300 may set or input a test object, a test method, a test order, etc.

As shown in FIG. 1, the output unit 400 is installed at an upper part of the robot cleaner. However, the installation position may be variable in a different form. For instance, as shown in FIG. 10, the output unit 400 outputs, to a screen, reservation information, a battery state, an intensive cleaning, a space extension, and a cleaning or running operation in a zigzag form. The output unit 400 may output an inner state of the robot cleaner sensed by a sensing unit 100, e.g., current statues of units of the robot cleaner, and a current cleaning state. The output unit 400 may display, on a screen, external information sensed by the sensing unit 100, obstacle information, position information, a cleaning region, a cleaning map, etc. The output unit 400 may be implemented as one of a light emitting diode (LED), a liquid crystal display (LCD), a plasma display panel (PDP), and an organic light emitting diode (OLED).

The output unit 400 may further include a sound output means configured to output an execution result of a self test mode in the form of sound. For instance, the output unit 400 may output an alarm sound to the outside according to an alarm signal. The sound output means includes a beeper, a speaker, etc. The output unit 400 may output a test result to the outside based on audio information stored in a storage unit The controller 200 checks one or more preset execution conditions before executing the self test mode. Here, the preset execution conditions for a self test mode include a mounted state of a dust box, an attached state of a dustcloth plate, a battery state, etc.

The storage unit 500 may store individual algorithms according to a test object, a test method, etc., or may store an entire test algorithm in advance. The storage unit 500 may store audio information for outputting a state and a test result of the robot cleaner to the outside. That is, the storage unit 500 pre-stores a state of the robot cleaner, an execution result of a self test mode, etc. by patterning in the form of text data or audio data. The output unit 400 signal-processes audio information stored in the storage unit by a signal processor provided thereat, and outputs the signal-processed audio information to the outside through the sound output means.

The storage unit 500 is configured to store therein a control program for controlling the robot cleaner, and relevant data. The storage unit 500 may be configured to further store therein image information, obstacle information, position information, a cleaning region, a cleaning map, etc., as well as audio information. And, the storage unit 500 may store a cleaning type, a running type, etc. therein. As the storage unit 500, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical drive, a magnetic RAM, a PRAM, etc.

The object sensing unit 120 includes at least one of an external signal sensor, a first obstacle sensor (front sensor), a second obstacle sensor, a cliff sensor, a (lower) camera sensor and an upper camera sensor.

The robot cleaner comprises an external signal sensor configured to sense an external signal. The external signal sensor may be implemented as an infrared ray sensor, an ultra sonic sensor, a radio frequency sensor, etc. The robot cleaner receives a guide signal generated from a charging base by using the external signal sensor, thereby checking a position and a direction of the charging base. The charging base generates a guide signal instructing a direction and a distance thereof so that the robot cleaner may return to the charging base. The robot cleaner receives the guide signal generated from the charging base to check a current position, and sets a moving direction to return to the charging base. And, the robot cleaner senses a signal generated from a remote controlling device such as a remote controller and a terminal, by using the external signal sensor. The external signal sensor is provided inside or outside the robot cleaner. In the present disclosure, the external signal sensor is implemented as an infrared ray sensor. The infrared ray sensor 121 may be installed in the robot cleaner. For instance, as shown in FIG. 10, the infrared ray sensor 121 may be installed below the output unit, or at the periphery of the upper camera sensor.

Once a self test mode is executed, the controller 200 compares an output value from the infrared ray sensor with a reference value. Then, the controller 200 tests the infrared ray sensor based on a comparison result. In the self test mode, the controller 200 controls the robot cleaner to move in a predetermined pattern according to a test algorithm. If the infrared ray sensor has not received a signal from an external device such as the charging base within a predetermined distance, the controller 200 determines that the infrared ray sensor is in an abnormal state. Here, the reference value may be a predetermined number of times (frequency) including '0'. If the output sensor is in an abnormal state, the output unit 400 may output a voice message such as "This robot cleaner does not attempt charging due to a problem of the infrared ray sensor.", or "Please try to execute a test mode after turning off a main power switch disposed at a lower part of the body, and then turning on.", or "Please call the service center if the same problems are repeated.". Alternatively, the output unit 400 may display the message on a screen. If the infrared ray sensor is in an abnormal state, the robot cleaner cannot sense the charging base. Accordingly, the controller 200 stops the robot cleaner, and then controls the output unit to inform the current state to a user, etc.

Figure 6:
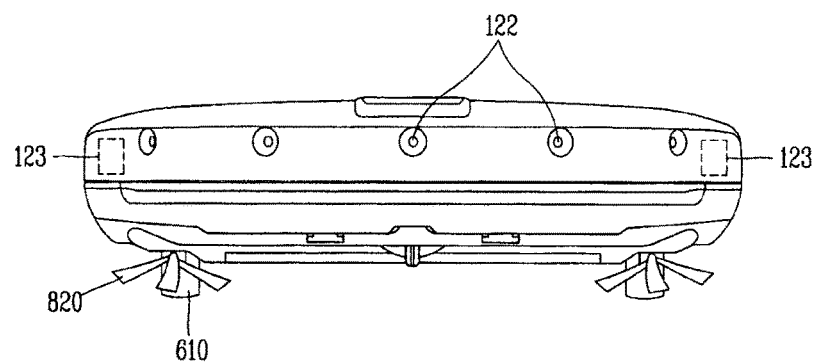
FIG. 6 is a front view of a robot cleaner according to one embodiment of the present disclosure.

The first obstacle sensor (front sensor) is installed on a front surface of the robot cleaner, e.g., on an outer circumferential surface with a predetermined gap therebetween as shown in FIG. 6. The front sensor senses an object (especially, an obstacle) in a moving direction of the robot cleaner, and transmits sensing information to the controller. That is, the front sensor senses a protrusion, a home appliance, furniture, a wall surface, a wall edge, etc. which are disposed on a moving path of the robot cleaner, and transmits sensing information to the controller. The front sensor may be implemented as an infrared ray sensor, a supersonic sensor, an RF sensor, a terrestrial magnetism sensor, etc. The robot cleaner may use one type of sensors, or two or more types of sensors as the front sensors. In the present disclosure, the front sensor is implemented as a supersonic sensor.

Figure 8:
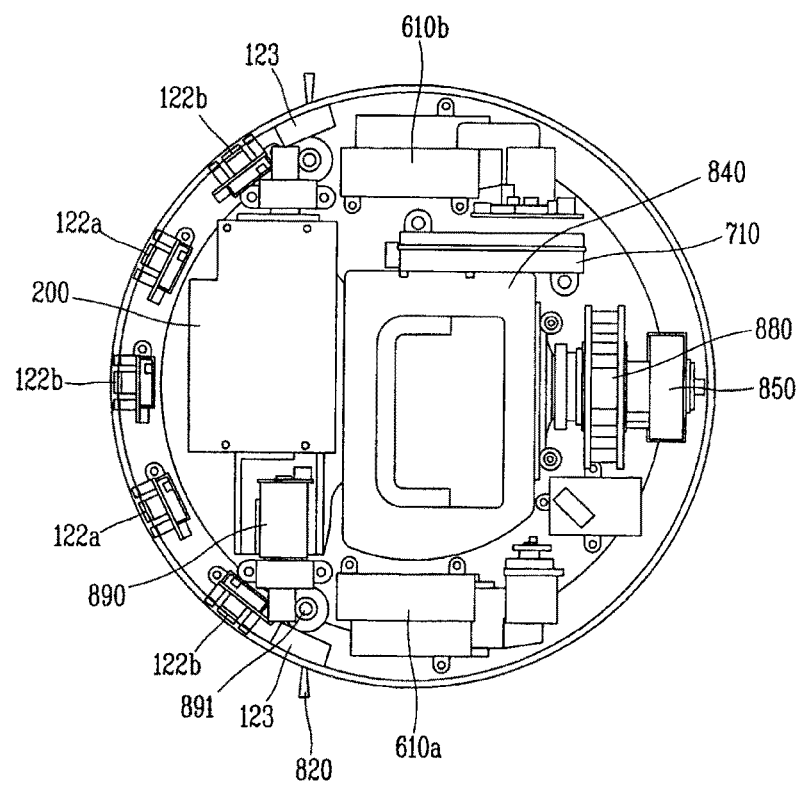
FIG. 8 is a sectional view showing the inside of a robot cleaner according to one embodiment of the present disclosure.

The supersonic sensor is generally used to sense an obstacle which is at a remote distance. The supersonic sensor is provided with a signal transmitting portion and a signal receiving portion. The controller 200 determines whether an obstacle exists or not based on whether a supersonic wave emitted from the signal transmitting portion has been received by the signal receiving portion after being reflected by an obstacle, etc. Then, the controller 200 calculates a distance between the robot cleaner and the obstacle based on time taken for the supersonic wave to be received by the signal receiving portion. Referring to FIG. 6 or FIG. 8, five supersonic sensors 122 are installed on a front outer circumferential surface of the robot cleaner. Referring to FIG. 8, the supersonic sensors consist of signal transmitting portions 122*a* and signal receiving portions 122*b* alternately disposed. That is, the signal transmitting portions 122*a* and the signal receiving portions 122*b* are alternately installed on a front surface of the robot cleaner. Referring to FIG. 6 or FIG. 8, the signal transmitting portions 122*a* are disposed at right and left sides based on the front center of the body. And, at least one signal transmitting portion 122*a* is disposed between the signal receiving portions 122*b*, thereby forming a reception region with respect to a signal reflected from an obstacle. Under this configuration, a reception region may be expanded in a state that the number of the sensors is reduced. An emitting angle of a supersonic wave is within a range not influencing on other signals for prevention of crosstalk. A reception (sensitivity) of the signal receiving portions 122*b* may be differently set. The supersonic sensor may be installed toward an upper side by a predetermined angle so that a supersonic wave emitted from the supersonic sensor may be upward outputted. And, the supersonic sensor may further include a shielding member configured to prevent a supersonic wave from being downward emitted.

The supersonic sensor transmits different output values to the controller according to whether an obstacle exists or not, and according to a distance between the robot cleaner and an obstacle. An output value range may be differently set according to a sensing range of the supersonic sensor. Once a self test mode is executed, the controller 200 compares an output value of the supersonic sensor with a reference value. Then, the controller 200 tests the supersonic sensor based on a comparison result. Since no object except for the charging base exists at the periphery of the robot cleaner in the self test mode, the supersonic sensor has to sense no obstacle. The controller 200 controls the robot cleaner to move in a predetermined pattern according to a test algorithm. If the supersonic sensor outputs a value more than a reference value in order to indicate the existence of an obstacle, the controller 200 determines that the supersonic sensor is in an abnormal state. For instance, the controller 200 may test whether the supersonic sensor is in an abnormal state or not, based on an output value obtained in a state that the robot cleaner is spaced from the charging base by a predetermined distance, an output value obtained in a state that the robot cleaner has rotated by 180°, an output value obtained in a state that the robot cleaner has straightly moved by a predetermined distance, etc. If the supersonic sensor is in an abnormal state, the output unit 400 may output a voice message such as "This robot cleaner does not attempt charging due to a problem of the supersonic sensor.", or "Please try to execute a test mode after turning off a main power switch disposed at a lower part of the body, and then turning on.", or "Please call the service center if the same problems are repeated.". Alternatively, the output unit 400 may display the message on a screen. If the supersonic sensor is in an abnormal state, the robot cleaner cannot sense the charging base disposed at a front side. This may cause the robot cleaner to collide with the charging base. Accordingly, the controller 200 stops the robot cleaner without allowing the robot cleaner to move to the charging base, and then controls the output unit to inform the current state to a user, etc.

As shown in FIG. 6 or FIG. 8, the second obstacle sensor 123 is installed on an outer circumferential surface of the robot cleaner together with the front sensor. Alternatively, the second obstacle sensor may be formed to have a surface protruding toward the outside of the body of the robot cleaner. The second obstacle sensor may be implemented as an infrared ray sensor, a supersonic sensor, an RF sensor, a position sensitive device (PSD) sensor, etc. The second obstacle sensor is configured to sense an obstacle disposed at a front side or a side surface, and to transmit obstacle information to the controller. That is, the second obstacle sensor senses a protrusion, a home appliance, furniture, a wall surface, a wall edge, etc. which are disposed on a moving path of the robot cleaner, and transmits sensing information to the controller. The robot cleaner may move with maintaining a constant distance from a wall surface by using the front sensor or the second obstacle sensor. In the present disclosure, the front sensor is implemented as a PSD sensor.

The PSD sensor is implemented as one p-n junction device, and is configured to sense a distance of incident light using a semiconductor surface resistance. The PSD sensor includes a primary PSD sensor configured to sense light in one direction, and a secondary PSD sensor configured to sense an optical position on a plane. Both of the primary PSD and the secondary PSD have a pin photodiode structure. The PSD sensor is a sort of infrared ray sensor, and is configured to sense an obstacle by emitting an infrared ray to the obstacle, and configured to measure a distance between the robot cleaner and the obstacle based on time taken for the infrared ray to return after reflection. The PSD sensor 123 is provided with a light transmitting portion 123*a* configured to emit an infrared ray to an obstacle, and a light receiving portion 123*b* configured to receive an infrared ray which returns after being reflected from the obstacle. The light transmitting portion and the light receiving portion are generally implemented in the form of a module. The PSD sensor obtains stable measurement values regardless of reflectivity of an obstacle and a color difference with using a triangulation method.

Like the supersonic sensor, the PSD sensor transmits different output values to the controller according to whether an obstacle exists or not, and according to a distance between the robot cleaner and an obstacle. An output value range may be differently set according to a sensing range of the PSD sensor. Once a self test mode is executed, the controller 200 compares an output value of the PSD sensor with a reference value. Then, the controller 200 tests the PSD sensor based on a comparison result. Since no object except for the charging base exists at the periphery of the robot cleaner in the self test mode, the PSD sensor has to sense no obstacle. The controller 200 controls the robot cleaner to move in a predetermined pattern according to a test algorithm. If the PSD sensor outputs a value more than a reference value, the controller 200 determines that the PSD sensor is in an abnormal state. For instance, the controller 200 may test whether the PSD sensor is in an abnormal state or not, by making the robot cleaner straightly move in an opposite direction to the charging base by a predetermined distance, and then by comparing an output value with a reference value. If the PSD sensor is in an abnormal state, the output unit 400 may output a voice message such as "Please clean windows of the obstacle sensors of right and left sides.". Alternatively, the output unit 400 may display the message on a screen.

Figure 7:
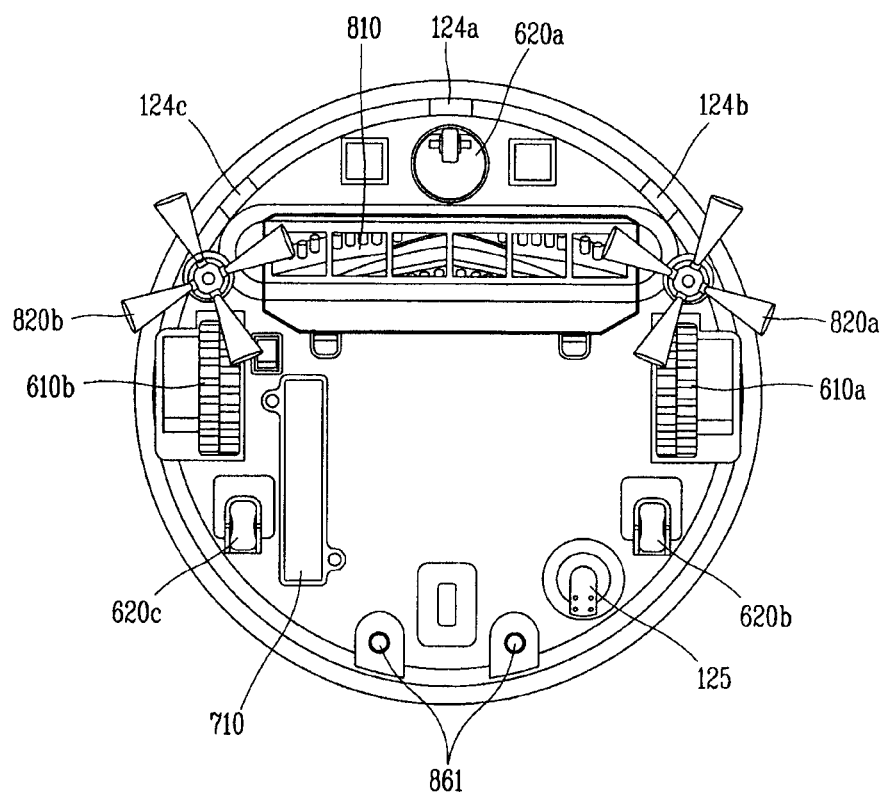
FIG. 7 is a rear view showing a lower part of a robot cleaner according to one embodiment of the present disclosure.
Figure 11:
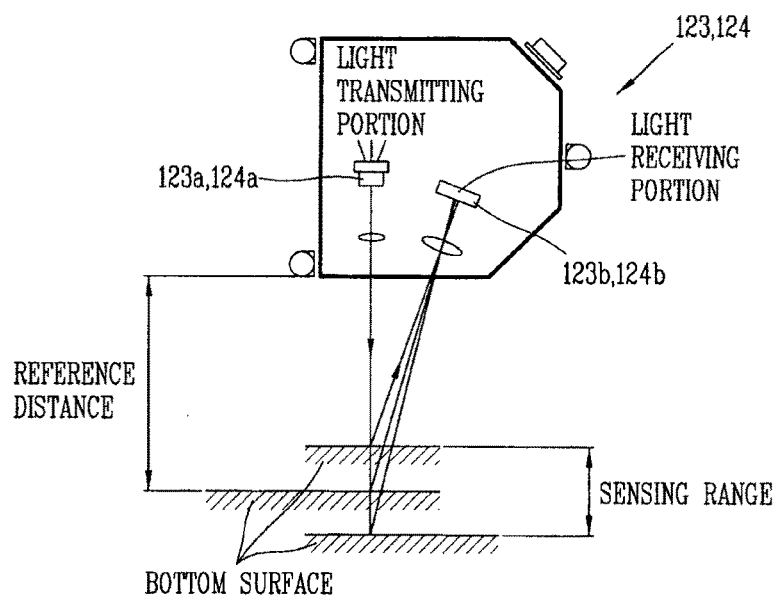
FIG. 11 is a detailed view of a cliff sensor of a robot cleaner according to one embodiment of the present disclosure.

The cliff sensor may be implemented as various types of optical sensor. In the present disclosure, the cliff sensor is implemented as an infrared ray sensor. As shown in FIG. 11, like the obstacle sensor, the cliff sensor 124 may be implemented in the form of an infrared ray sensor module having a light transmitting portion 124a and a light receiving portion 124b. The cliff sensor 124 may be provided with a reference distance and a sensing range shown in FIG. 11. The cliff sensor 124 obtains stable measurement values regardless of reflectivity of a floor surface and a color difference with using a triangulation method. Referring to FIG. 7, the cliff sensor 124 is provided in a recess having a predetermined depth and disposed on a bottom surface of the robot cleaner. The cliff sensor may be installed at another position according to a type of the robot cleaner.

Referring to FIG. 7, one cliff sensor is installed at a front surface of the robot cleaner, and two cliff sensors are installed behind the one cliff sensor. More concretely, it is assumed that the front cliff sensor is called a first sensor 124a, and the rear cliff sensors are called second sensors 124b and 124c, for convenience. Generally, the first and second sensors are implemented as the same type of sensors, e.g., infrared ray sensors. However, the first and second sensors may be implemented as different types of sensors. The controller 200 may control the first sensor to emit an infrared ray toward the ground, and to sense a cliff and to calculate a depth of the cliff based on time taken for the infrared ray to return after reflection. Also, the controller 200 may control the second sensor to check a ground state of a cliff sensed by the first sensor. For instance, the controller 200 controls the first sensor to determine whether a cliff exists or not and a depth of the cliff, and controls the second sensor to pass through the cliff only when a reflected signal has been sensed. As another example, the controller 200 may determine whether the robot cleaner is in a levitated state by combining sensing results by the first and second sensors with each other.

The cliff sensor is configured to consecutively sense a floor surface while the robot cleaner moves. Once a self test mode is executed, the controller 200 compares an output value from the cliff sensor with a reference value. Then, the controller 200 tests the cliff sensor based on a comparison result. In the self test mode, the controller 200 controls the robot cleaner to move in a predetermined pattern according to a test algorithm. If the cliff sensor outputs a value more than a reference value, the controller 200 determines that the cliff sensor is in an abnormal state. For instance, if an output value of the cliff sensor is more than a reference value in a state the robot cleaner has straightly moved by a predetermined distance, the controller 200 determines that the cliff sensor is in an abnormal state. If the cliff sensor is in an abnormal state, the output unit 400 may output a voice message such as "The cliff sensor on the front floor is in an abnormal state." or "This robot cleaner does not attempt charging due to a problem of the cliff sensor.", or "Please clean the cliff sensor.". Alternatively, the output unit 400 may display the message on a screen. If the cliff sensor is in an abnormal state, the robot cleaner cannot sense a cliff disposed at a front side. This may cause the robot cleaner to have damages. Accordingly, the controller 200 stops the robot cleaner without allowing the robot cleaner to move to the charging base, and then controls the output unit to inform the current state to a user, etc.

Figure 12:
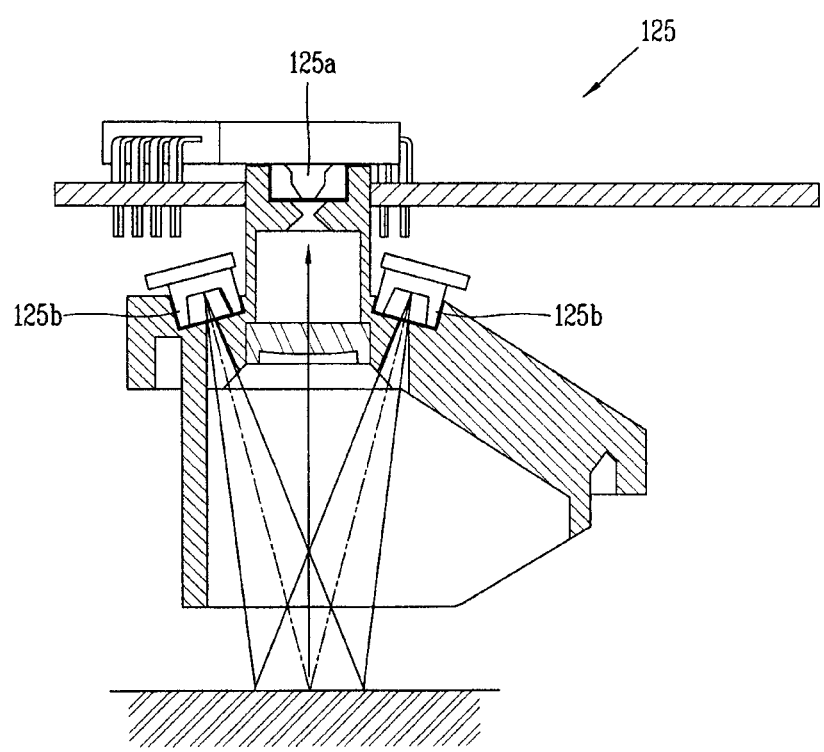
FIG. 12 is a detailed view of a camera sensor of a robot cleaner according to one embodiment of the present disclosure.
Figure 13:
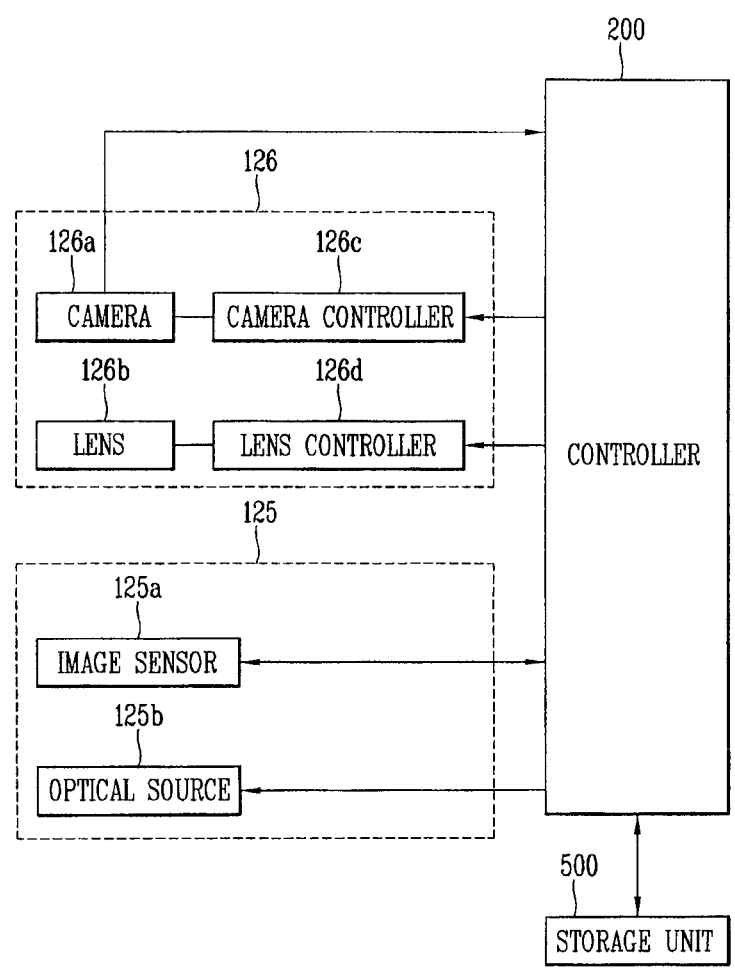
FIG. 13 is a block diagram showing a configuration of a robot cleaner according to another embodiment of the present disclosure.

As shown in FIG. 7, the (lower) camera sensor 125 is provided on a rear surface of the robot cleaner, and is configured to capture the floor, a surface to be cleaned while the robot cleaner moves. The lower camera sensor 125 is called an 'optical flow sensor'. The lower camera sensor converts a down side image inputted from an image sensor 125a provided therein, thereby generating a predetermine type of image data. The generated image data is stored in the storage unit 500. The lower camera sensor may be further provided with a lens, and a lens controller for controlling the lens. As the lens, preferably used is a pan focus type lens having a short focal distance and a deep depth. The lens controller is provided with a motor for moving the lens back and forth, and a moving means, thereby controlling the lens. As shown in FIG. 12 or FIG. 13, one or more optical sources 125b may be installed near the image sensor 125a. The one or more optical sources 125b irradiate light to the floor captured by the image sensor 125a. More concretely, if the floor along which the robot cleaner is moving is flat, a distance between the image sensor and the floor is constantly maintained. On the other hand, if the floor along which the robot cleaner is moving is not even, the distance between the image sensor and the floor becomes long due to a protrusion and an obstacle on the floor. Here, the one or more optical sources may be configured to control the amount of light to be irradiated. The optical source is implemented as a light emitting device capable of controlling an optical amount, e.g., a light emitting diode (LED) or a laser.

The lower camera sensor may sense a position of the robot cleaner regardless of sliding of the robot cleaner. The controller 200 calculates a moving distance and a moving direction of the robot cleaner by analyzing image data captured by the lower camera sensor according to time, thereby calculating a position of the robot cleaner. Since the lower camera sensor observes a lower side of the robot cleaner, a position of the robot cleaner having not been precisely calculated by another means due to sliding may be compensated under control of the controller 200.

The lower camera sensor provides an output value more than a predetermined value to the controller since it always captures the floor while the robot cleaner moves. Once a self test mode is executed, the controller 200 tests the lower camera sensor based on whether an output value of the lower camera sensor is more than a predetermined value (e.g., any value including '0'). For instance, the controller 200 controls the robot cleaner to straightly move by a predetermined distance in an opposite direction to the charging base according to a test algorithm. In this case, if the lower camera sensor provides an output value less than a predetermined value, or an output value out of range, the controller 200 determines that the lower camera sensor is in an abnormal state. If the lower camera sensor is in an abnormal state, the output unit 400 may output a voice message such as "Please clean a window of the lower camera sensor on the right floor.". Alternatively, the output unit 400 may display the message on a screen.

Figure 5:
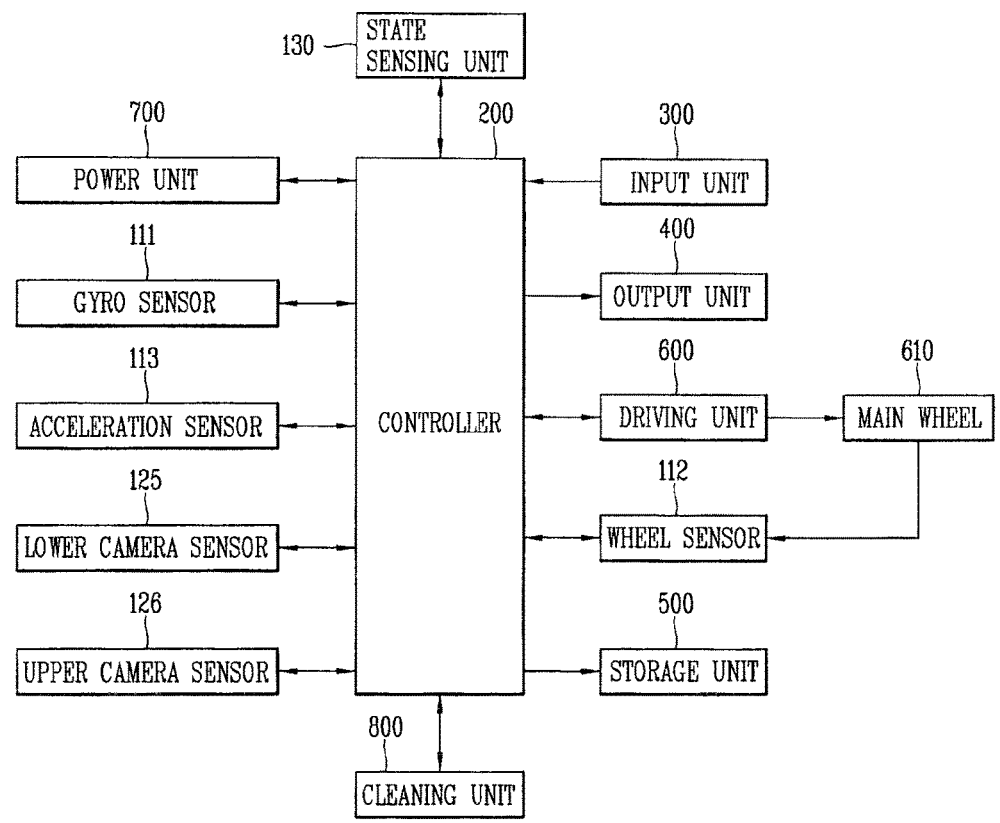

Referring to FIG. 1 or FIG. 5, the robot cleaner may further comprise an upper camera sensor 126 installed toward an upper side or a front side, and configured to capture the periphery of the robot cleaner. When the upper camera sensor is implemented in plurality in number, the upper camera sensors may be formed on an upper surface or side surfaces of the robot cleaner with a predetermined distance therebetween or with a predetermined angle. Referring to FIG. 13, the upper camera sensor 126 may include a lens 126b connected to a camera 126a and focusing the camera on a subject, a camera controller 126c, and a lens controller 126d. As the lens 126b, preferably used is a lens having a wide view angle so that all the peripheral regions, e.g., all the regions on a ceiling may be captured at a predetermined position. For instance, the lens is implemented as a lens having a view angle more than a predetermined angle, 160°. The controller 200 may test whether the upper camera sensor is in an abnormal state or not, based on whether the upper camera sensor has captured an image or not, or based on image data captured by the upper camera sensor.

The controller 200 may extract feature points from image data captured by the upper camera sensor, may recognize a position of the robot cleaner based on the feature points, and may create a map with respect to a cleaning region. The controller 200 may precisely recognize a position of the robot cleaner based on sensing information by an acceleration sensor, a gyro sensor, a wheel sensor and the lower camera sensor, and based on image data captured by the upper camera sensor. And, the controller 200 may precisely create a map with respect to a cleaning region, based on obstacle information sensed by the front sensor or the second obstacle sensor, and based on a position of the robot cleaner recognized by the upper camera sensor.

Referring to FIG. 5, the robot cleaner according to embodiments of the present disclosure further comprises a state sensing unit 130 configured to sense a state of each unit of the robot cleaner. The state sensing unit 130 includes a sensor for sensing a main wheel state, a sensor for sensing a wheel drop switch state, a sensor for sensing a suction motor state, a sensor for sensing an agitator state, etc. And, the state sensing unit 130 includes a sensor for sensing a dust box state, a sensor for sensing a battery state, a sensor for sensing a dustcloth state, etc. The controller 200 is configured to check one or more preset execution conditions before executing the self test mode. The one or more preset execution conditions indicate one of a mounted state of a dust box, an attached state of a dustcloth plate and a battery state, or a combination thereof. The controller 200 checks a current operation mode, checks whether a reservation cleaning has been set, and then executes a self test mode.

Referring to FIGS. 6 to 9, the robot cleaner is provided with a left main wheel 610a and a right main wheel 610b at both sides of a lower part thereof. A handle may be installed at two side surfaces of the main wheels so as to facilitate a user's grasp. Wheel motors are connected to the main wheels, respectively to rotate the main wheels. And, the wheels motors rotate independently from each other, and can rotate in two directions. The robot cleaner is provided with one or more auxiliary wheels on a rear surface thereof for support. The auxiliary wheels serve to minimize friction between the robot cleaner and a floor surface to be cleaned, and allow the robot cleaner to smoothly move.

Once a command to execute a self test mode is input, the controller 200 tests a state of the wheel motor. The controller 200 is provided with a current sensor 730a to sense a driving current of the wheel motor. Then, the controller 200 compares the sensed driving current with a reference current, and tests a state of the wheel motor based on a comparison result. As the current sensor, a current transducer, etc. may be used. Alternatively, a shunt resistance may be used. When the main wheels are in an abnormal state, the output unit 400 may output a voice message such as "Please check foreign materials on the left main wheel." or "Please check foreign materials on the right main wheel.", or may display the message on a screen.

The robot cleaner may further comprise a wheel drop switch configured to inform a levitated state of the main wheels from the floor surface by a user or an obstacle. Generally, the wheel drop switch is implemented as a contact type mechanical switch. Once a command to execute a self test mode is input, the controller 200 checks a state of the wheel drop switch. In a normal running mode, the wheel drop switch has to be always turned off. Therefore, the controller 200 checks whether the wheel drop switch is in an OFF state after executing a self test mode. If the wheel drop switch is in an ON state, the output unit 400 may output a voice message such as "The left (right) wheel drop switch is in an abnormal state.", or "Please try to execute a smart test after turning off a main power switch disposed at a lower part of the body, and then turning on.", or "Please call the service center if the same problems are repeated.". Alternatively, the output unit 400 may display the message on a screen. The storage unit 500 may store the message in advance.

Referring to FIGS. 3 to 5, the robot cleaner further comprises a cleaning unit 800. Referring to FIGS. 6 to 9, the cleaning unit 800 consists of a dust box 840 configured to store collected dust particles therein, a suction fan 880 configured to provide a driving power to suck dust particles within a cleaning region, and a suction motor 850 configured to suck air by rotating the suction fan. Under this configuration, the cleaning unit 800 sucks foreign materials or dust particles. The suction fan 880 includes a plurality of blades 881 configured to flow air, and a member formed in a ring shape at an upstream side of the blades, and configured to connect the blades to one another and configured to guide air introduced toward a shaft of the suction fan to a direction perpendicular to the shaft.

Once a command to execute a self test mode is input, the controller 200 tests a state of the suction motor 850. The controller 200 is provided with a current sensor to sense a driving current of the suction motor 850. Then, the controller 200 compares the sensed driving current with a reference current, and tests a state of the suction motor 850 based on a comparison result. As the current sensor, a current transducer, etc. may be used. Alternatively, a shunt resistance may be used. When the suction motor is in an abnormal state, the output unit 400 may output a voice message such as "The suction motor has a problem." or "Please try to execute a smart test after turning off a main power switch disposed at a lower part of the body, and then turning on.", or "Please call the service center if the same problems are repeated.". Alternatively, the output unit 400 may display the message on a screen.

The cleaning unit 800 further includes an agitator 810 rotatably mounted to a lower part of the body of the robot cleaner, and a side brush 820 configured to clean a corner or an edge of a wall, etc. with rotating centering around a vertical shaft of the body. The agitator 810 makes dust particles on the floor surface or a carpet move to the air with rotating centering around a horizontal shaft of the body of the robot cleaner. A plurality of blades are provided on an outer circumferential surface of the agitator 810 in a spiral form. A brush may be provided between the blades. Since the agitator 810 and the side brush 820 rotate centering around different shafts, the robot cleaner has to be provided with motors for driving the agitator and the side brush, respectively. As shown in FIG. 5, both of the agitator and the side brush may be operated by one brush motor. More concretely, the side brush may be disposed at both sides of the agitator, and a motor means 891 configured to transmit a rotational force of the agitator to the side brush may be disposed between the agitator and the side brush. In the latter case, worms and worm gears, or a belt may be used as the motor means.

Once a command to execute a self test mode is input, the controller 200 tests a state of the brush motor 890. The controller 200 rotates the agitator 810, and senses an RPM of the agitator 810. Then, the controller 200 compares the sensed RPM with a reference RPM, and tests whether the agitator is in an abnormal state or not based on a comparison result. For instance, the reference RPM may be set as 500 RPM. If the agitator is in an abnormal state, the output unit 400 may output a voice message such as "Please check whether the agitator has foreign materials.", or may display the message on a screen.

Figure 9:
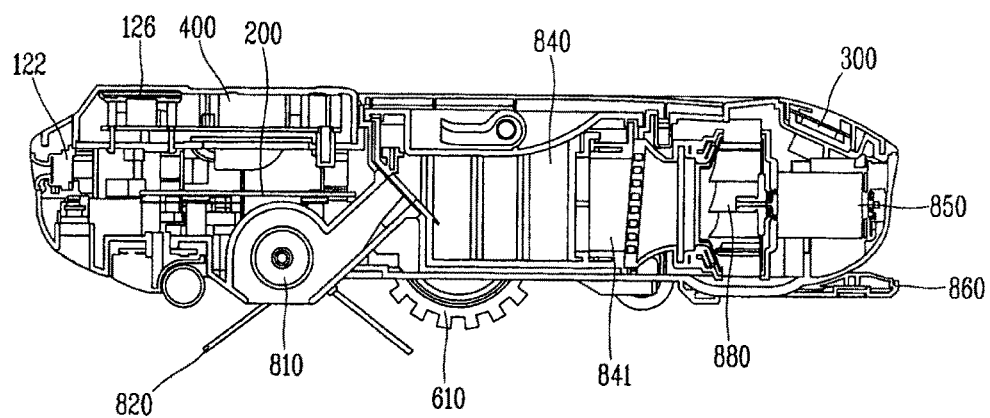
FIG. 9 is a side sectional view of a robot cleaner according to one embodiment of the present disclosure.

Referring to FIG. 8 or FIG. 9, the cleaning unit 800 further includes a dust box 840 configured to collect dust particles, and an accommodation portion configured to accommodate the dust box therein. As shown in FIG. 9, the cleaning unit 800 may further include a filter 841 formed in an approximate rectangular parallelepiped shape, and configured to filter dust particles or foreign materials included in the air. The filter 841 may consist of a first filter and a second filter, and may have a bypass filter at a body thereof. The first filter and the second filter may be implemented as mesh filters or HEPA filters, or may be formed of one of non-woven fabric and a paper filter or a combination thereof.

A state of the dust box may include a dust amount included in the dust box, and a mounted or detached state of the dust box to/from the robot cleaner. In the former case, the amount of dust particles included in the dust box may be sensed by inserting a piezoelectric sensor, etc., into the dust box. In the latter case, whether the dust box is in a mounted state to the robot cleaner or not may be sensed in various manners. For instance, as a sensor for sensing whether the dust box is in a mounted state to the robot cleaner or not, may be used a micro switch turned on/off by being installed on a bottom surface of a recess where the dust box is mounted, a magnetic sensor using a magnetic field of a magnet or a magnetic substance, an optical sensor having a light transmitting portion and a light receiving portion and configured to receive light, etc. The magnetic sensor may further include a sealing member formed of a synthetic rubber and disposed at an attachment part to a magnet or a magnetic substance.

Once a command to execute a self test mode is input, the controller 200 firstly checks whether the dust box has been mounted to the robot cleaner or not. If the dust box has not been mounted to the robot cleaner, the output unit 400 may output a voice message such as "Please check the dust box.", or may display the message on a screen. The storage unit 500 may store the message in advance. In another operation mode rather than a self test mode, e.g., a cleaning or running mode, it is firstly checked whether the dust box has been mounted to the robot cleaner.

Referring to FIG. 4 or FIG. 5, the robot cleaner further comprises a power unit 700. The power unit 700 is provided with a chargeable battery 710 to supply power into the robot cleaner. The power unit 700 supplies, to each unit, a driving power and an operation power required when the robot cleaner moves or performs a cleaning operation. When the remaining amount of battery power is deficient, the power unit moves to a charging base to be supplied with a charging current. As the battery is connected to a battery sensing unit, the remaining amount and a charged state of the battery are transmitted to the controller 200. As shown in FIG. 10, the output unit 400 may display, on a screen, the remaining amount of battery power by the controller. The battery may be disposed at a central lower part of the robot cleaner. Alternatively, as shown in FIG. 7, the battery may be disposed at one of right and left sides so that the dust box may be positioned at the lowest end of the body. In the latter case, the robot cleaner may be further provided with a balance weight for preventing an unbalanced state of the battery.

Once a command for executing a self test mode is input, the controller 200 firstly checks the remaining amount and a state of the battery. If the remaining amount of battery power is less than a reference value, the output unit 400 may output a voice message such as "The remaining amount of battery power is deficient." and "This robot cleaner cannot enter a test mode due to lack of the remaining amount of battery power." Alternatively, the output unit 400 may display the message on a screen. The storage unit 500 may store the message in advance.

Referring to FIG. 9, the cleaning unit 800 further includes a dustcloth plate 860 detachably mounted to a lower part of the body of the robot cleaner. The dustcloth plate may include a dustcloth detachably mounted thereto. A user may detach the dustcloth from the dustcloth plate for washing or replacement. The dustcloth may be mounted to the dustcloth plate in various manners. Preferably, the dustcloth may be mounted to the dustcloth plate by using an attachment cloth, so-called Velcro. For instance, the dustcloth plate is mounted to the body of the robot cleaner by a magnetic force. The dustcloth plate may be provided with a first magnet, and a metallic member or a second magnet corresponding to the first magnet may be provided at the body of the robot cleaner. Once the dustcloth plate is precisely disposed on a bottom surface of the body of the robot cleaner, the dustcloth plate is fixed to the body of the robot cleaner by the first magnet and the metallic member, or by the first and second magnets. The robot cleaner further comprises a sensor configured to sense whether the dustcloth plate has been mounted to the robot cleaner or not. The sensor may be implemented as a reed switch operated by a magnetic force, or a hall sensor, etc. For instance, the reed switch is provided at the body of the robot cleaner. And, the reed switch is operated when the dustcloth plate is mounted to the body of the robot cleaner, and outputs a signal indicating the mounted state to the controller.

Once a command to execute a self test mode is input, the controller determines whether to mount the dustcloth plate to the robot cleaner or not, based on the signal indicating the mounted state. If the dustcloth plate has been mounted to the robot cleaner, sensors may have different output values. Therefore, it is required to execute a test mode after detaching the dustcloth plate from the robot cleaner. If the dustcloth plate has been mounted to the robot cleaner, the output unit 400 may output a voice message, such as "This robot cleaner cannot enter a test mode due to the mounted dustcloth plate." or "Please try again after removing the dustcloth plate from the robot cleaner.". Alternatively, the output unit 400 may display the message on a screen. The storage unit 500 may store the message in advance. In another operation mode rather than a self test mode, e.g., a cleaning or running mode, it is firstly checked whether the dustcloth plate has been mounted to the robot cleaner.

A self test operation of the robot cleaner according to one embodiment of the present disclosure will be explained with reference to FIGS. 14 to 18.

Figure 14:
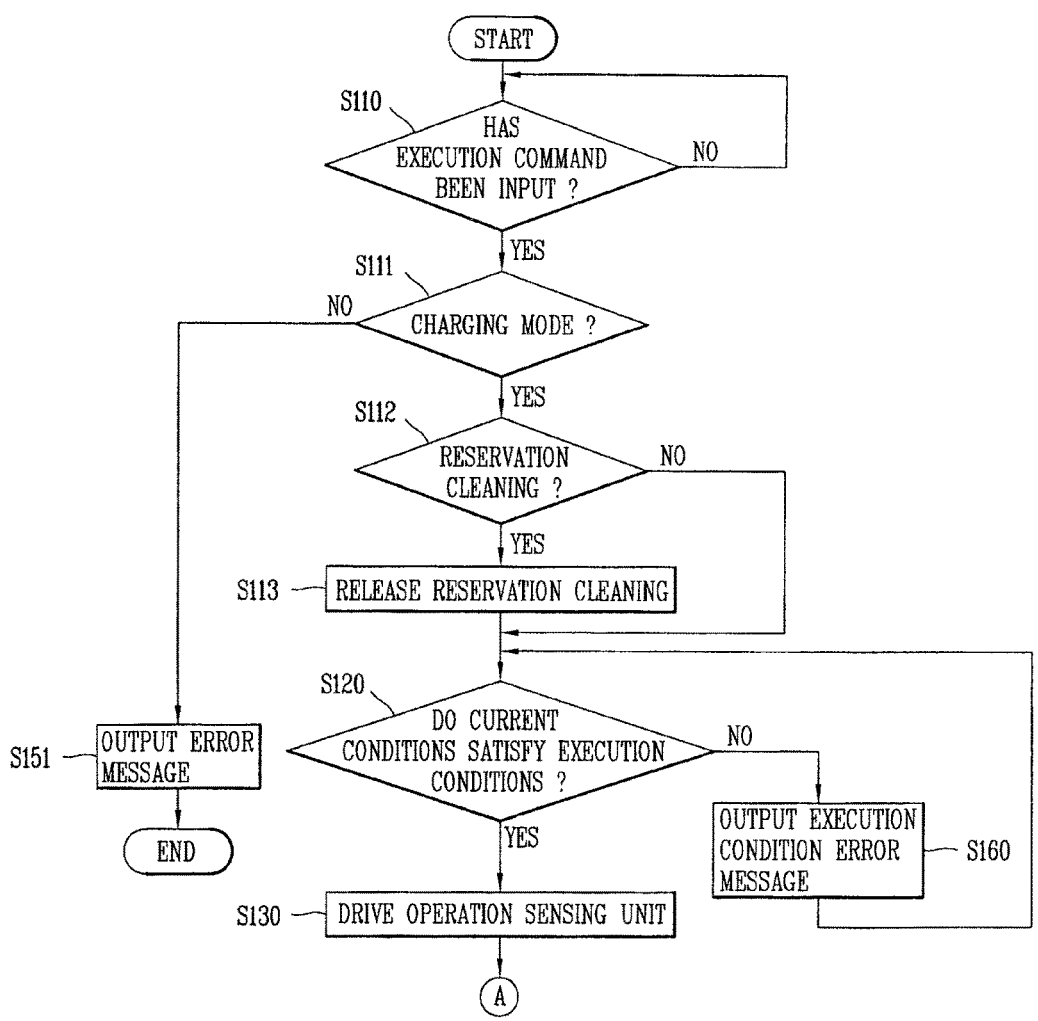
FIGS. 14 to 18 are flowcharts schematically showing a self testing method of a robot cleaner according to one embodiment of the present disclosure.
Figure 15:
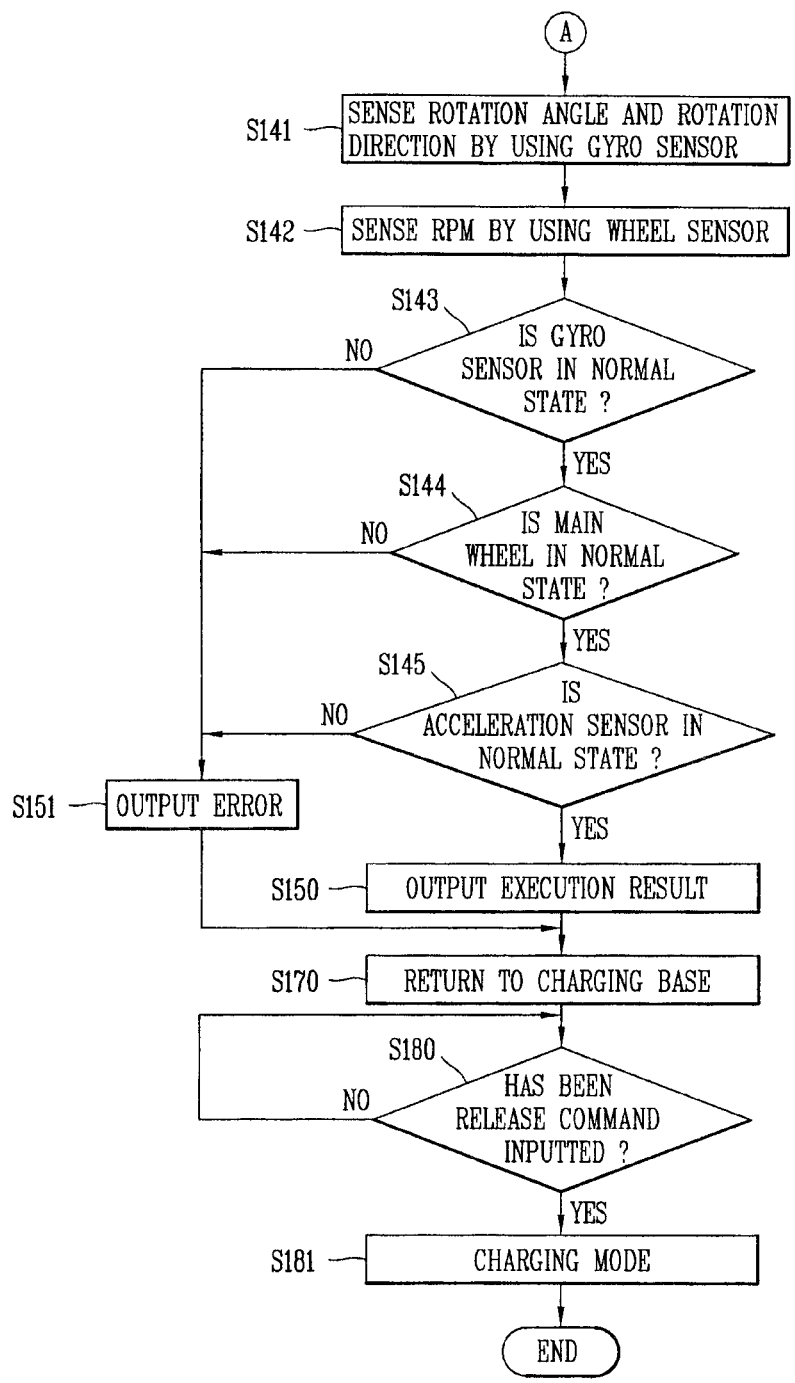

Referring to FIGS. 14 and 15, once an execution command of a self test mode among a plurality of operation modes is input (S110), the robot cleaner checks one or more preset execution conditions before executing the self test mode (S120). The plurality of operation modes include a self test mode, a charging mode, a cleaning mode, a running mode, a standby mode, etc., and the cleaning mode and the running mode further include one or more types or patterns. A user may input an execution command of a self test mode, by pressing one of buttons installed on an upper surface of the robot cleaner, or by pressing the buttons in a constant form, or by pressing one button for a predetermined time. As another example, the robot cleaner may receive an execution command of a self test mode by receiving a control signal from a remote controller, a terminal, etc. with using a sensor or a communication means mounted therein.

The one or more preset execution conditions indicate one of a mounted state of a dust box, an attached state of a dustcloth plate and a battery state, or a combination thereof. The robot cleaner checks a current operation mode, checks whether a reservation cleaning has been set, and then executes an operation sensing unit (S130). Then, the robot cleaner tests a state of the operation sensing unit based on sensing information outputted from the operation sensing unit (S140). The robot cleaner may be programmed so as to execute a self test mode only when a current mode thereof is in a preset mode, e.g., a charging mode (S112). If the current states of the robot cleaner do not satisfy the preset execution conditions, the robot cleaner outputs an error message (S151 or S160). For instance, if the current states of the robot cleaner do not satisfy the preset execution conditions, the robot cleaner may output a voice message such as "Please check a dustbox." or "I cannot enter a test mode due to lack of the remaining amount of battery power." or "I cannot enter a test mode due to an attached state of a dustcloth plate.". Alternatively, the robot cleaner may display the message on a screen. If a reservation cleaning has been set, the robot cleaner may output a voice message such as "Reservation has been cancelled for a self test." or "A self test will start." Alternatively, the robot cleaner may display the message on a screen.

If the current states of the robot cleaner satisfy the preset execution conditions, the robot cleaner may output a voice message such as "A self test mode will start." or "Please keep away and put objects within one meter of the charging base away." Alternatively, the robot cleaner may display the message on a screen. Then, the robot cleaner executes a self test mode (S130).

Referring to FIG. 14, once an execution command is received (S110), the robot cleaner checks execution conditions of a self test mode. That is, the robot cleaner checks whether a current mode is a charging mode (S112), a reservation cleaning has been set (S111), a dustbox has been mounted, a dustcloth plate has been detached from the robot cleaner, a battery state is in a low battery state (S120). If the current states of the robot cleaner satisfy all the preset execution conditions, the robot cleaner executes a self test mode by driving the operation sensing unit (S130).

FIG. 15 shows an example to test the operation sensing unit. The robot cleaner is separated from the charging base, and rotates by 180° to the right or left side to sense a rotation angle and a rotation direction by using a gyro sensor (S141). Here, the robot cleaner senses RPMs of right and left main wheels by using a wheel sensor, and calculates a rotation direction and a rotation distance based on a difference of the RPMs (S142). The robot cleaner compares the rotation angle sensed by using the gyro sensor, with a rotation angle calculated based on the RPMs sensed by using the wheel sensor. If a difference between the rotation angles compared with each other is within a predetermined range, the robot cleaner determines that the gyro sensor is in a normal state. On the other hand, if the difference between the rotation angles compared with each other is out of a predetermined range, the robot cleaner determines that the gyro sensor is in an abnormal state (S143). The robot cleaner tests a state of a main wheel by comparing the RPMs of the right and left main wheels with each other (S144). The robot cleaner compares an output value from an acceleration sensor with a reference value. If the output value is more than the reference value, the robot cleaner determines that the acceleration sensor is in an abnormal state (S145). If a test result is normal, the robot cleaner outputs an execution result (S150). On the other hand, if the operation sensing unit is in an abnormal state, the robot cleaner outputs an error message (S151). The robot cleaner may return to a charging base (S160), and may output an execution result (S150, S151). Then, the robot cleaner waits for a release command with respect to a self test mode (S180). Once a release command is input, the robot cleaner converts a current mode into a charging mode to charge a battery (S181).

Figure 16:
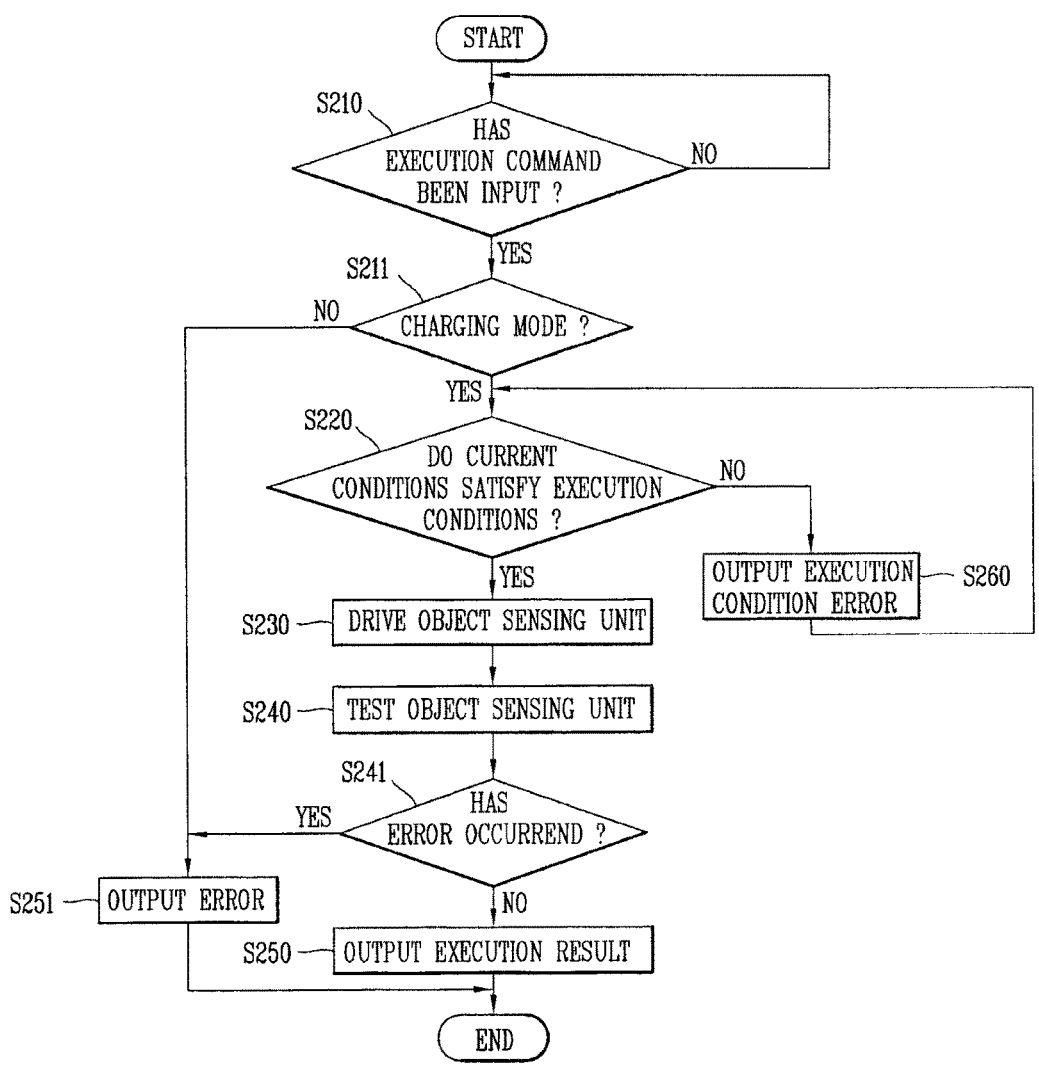
Figure 17:
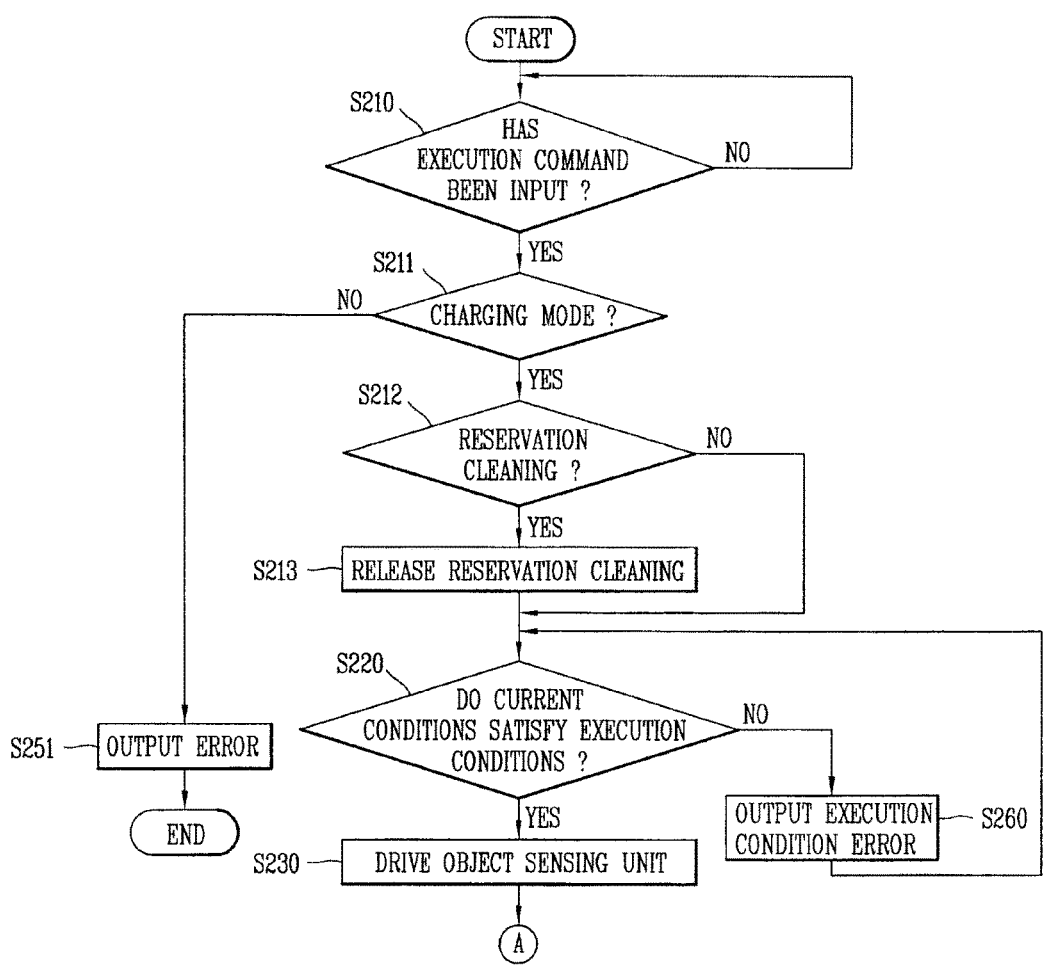
Figure 18:
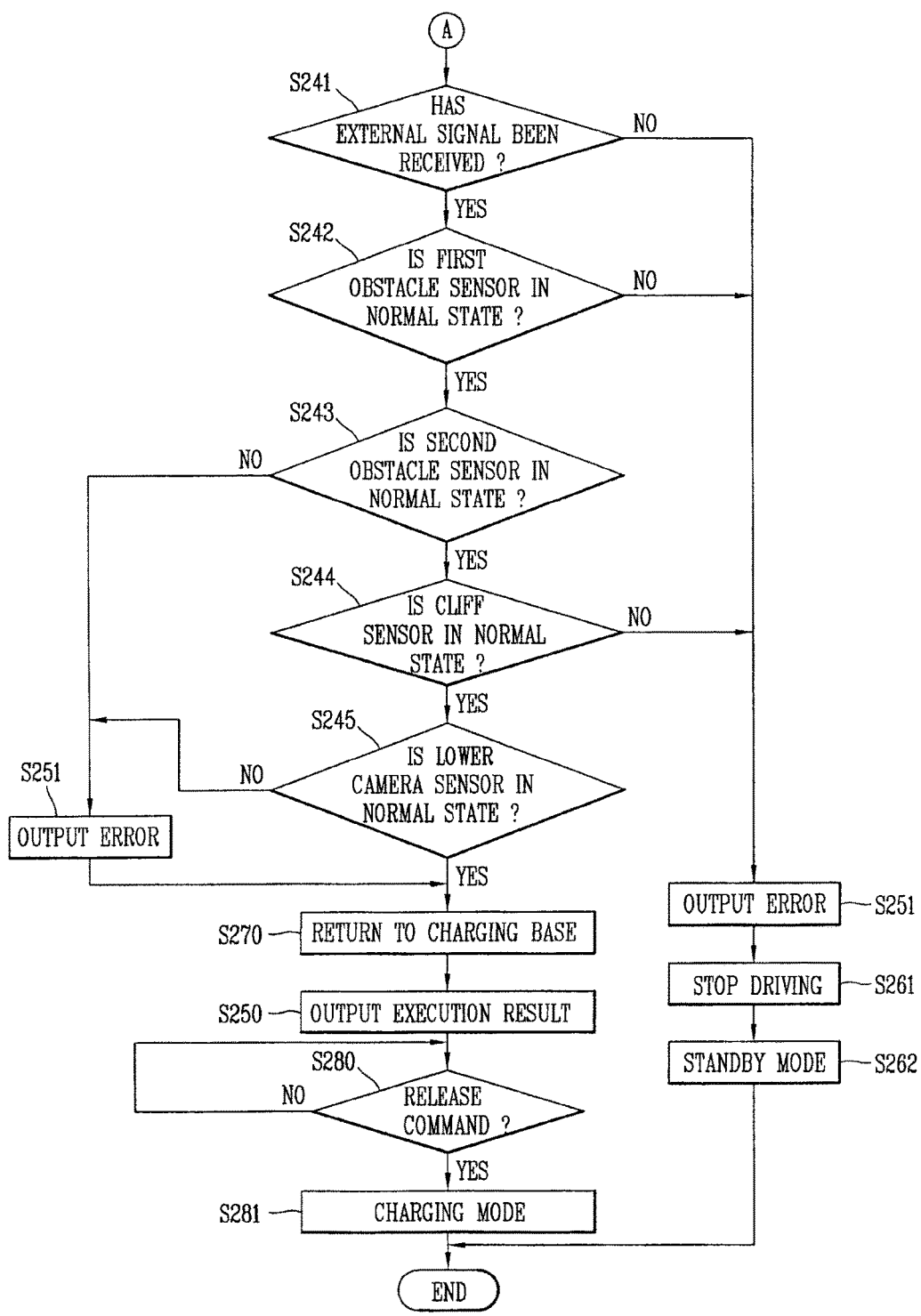

Referring to FIGS. 16 to 18, once an execution command of a self test mode among a plurality of operation modes is input (S210), the robot cleaner checks one or more preset execution conditions before executing the self test mode (S220). The plurality of operation modes include a self test mode, a charging mode, a cleaning mode, a running mode, a standby mode, etc., and further include one or more types or patterns. A user may input an execution command of a self test mode, by pressing one of buttons installed on an upper surface of the robot cleaner, or by pressing the buttons in a constant form, or by pressing one button for a predetermined time. As another example, the robot cleaner may receive an execution command of a self test mode by receiving a control signal from a remote controller, a terminal, etc. with using a sensor or a communication means mounted therein.

The one or more preset execution conditions indicate one of a mounted state of a dust box, an attached state of a dustcloth plate and a battery state, or a combination thereof. The robot cleaner checks a current operation mode, checks whether a reservation cleaning has been set, and then executes an object sensing unit (S230). Then, the robot cleaner tests a state of the object sensing unit based on sensing information outputted from the object sensing unit (S240). The robot cleaner may be programmed so as to execute a self test mode only when a current mode thereof is in a preset mode, e.g., a charging mode (S212). If the current states of the robot cleaner do not satisfy the preset execution conditions, the robot cleaner outputs an error message (S251 or S260). For instance, if the current states of the robot cleaner do not satisfy the preset execution conditions, the robot cleaner may output a voice message such as "Please check a dustbox." or "I cannot enter a test mode due to lack of the remaining amount of battery power." or "I cannot enter a test mode due to an attached state of a dustcloth plate.". Alternatively, the robot cleaner may display the message on a screen. If a reservation cleaning has been set, the robot cleaner may output a voice message such as "Reservation has been cancelled for a self test." or "A self test will start." Alternatively, the robot cleaner may display the message on a screen.

If the current states of the robot cleaner satisfy the preset execution conditions, the robot cleaner may output a voice message such as "A self test mode will start." or "Please keep away and put objects within one meter of the charging base away." Alternatively, the robot cleaner may display the message on a screen. Then, the robot cleaner executes a self test mode (S230).

Referring to FIG. 17, once an execution command is received (S210), the robot cleaner checks execution conditions of a self test mode. That is, the robot cleaner checks whether a current mode is a charging mode (S211), a reservation cleaning has been set (S212), a dustbox has been mounted, a dustcloth plate has been detached from the robot cleaner, a battery state is in a low battery state (S220). If the current states of the robot cleaner satisfy all the preset execution conditions, the robot cleaner executes a self test mode by driving an object sensing unit (S230).

FIG. 18 shows an example to test the object sensing unit. The robot cleaner tests whether an external signal sensor is in an abnormal state based on whether a guide signal generated from a charging base has been received or not (S241). The robot cleaner tests whether a first obstacle sensor (front sensor) is in an abnormal state based on whether an output value from the front sensor is more than a reference value (S242). The robot cleaner tests whether a second obstacle sensor (PSD sensor) is in an abnormal state based on whether an output value from the PSD sensor indicates no obstacle (S243). The robot cleaner tests whether a cliff sensor and a lower camera sensor are in an abnormal state by comparing output values from the cliff sensor and the lower camera sensor with reference values (S244 and S245). If the external signal sensor, the first obstacle sensor and the cliff sensor are in an abnormal state, the robot cleaner outputs an error message to a screen, or in the form of sound (S260). Then, the robot cleaner stops moving (S261), and enters a standby mode (S262). If a test result is normal, or if a problem has occurred on an object sensing unit rather than the preset sensors, the robot cleaner returns to a charging base (S270). Then, the robot cleaner outputs an execution result (S250 and S251), and waits for a release command with respect to the self test mode (S280). Once a release command is input, the robot cleaner converts a current mode into a charging mode to charge a battery (S281).

Figure 19:
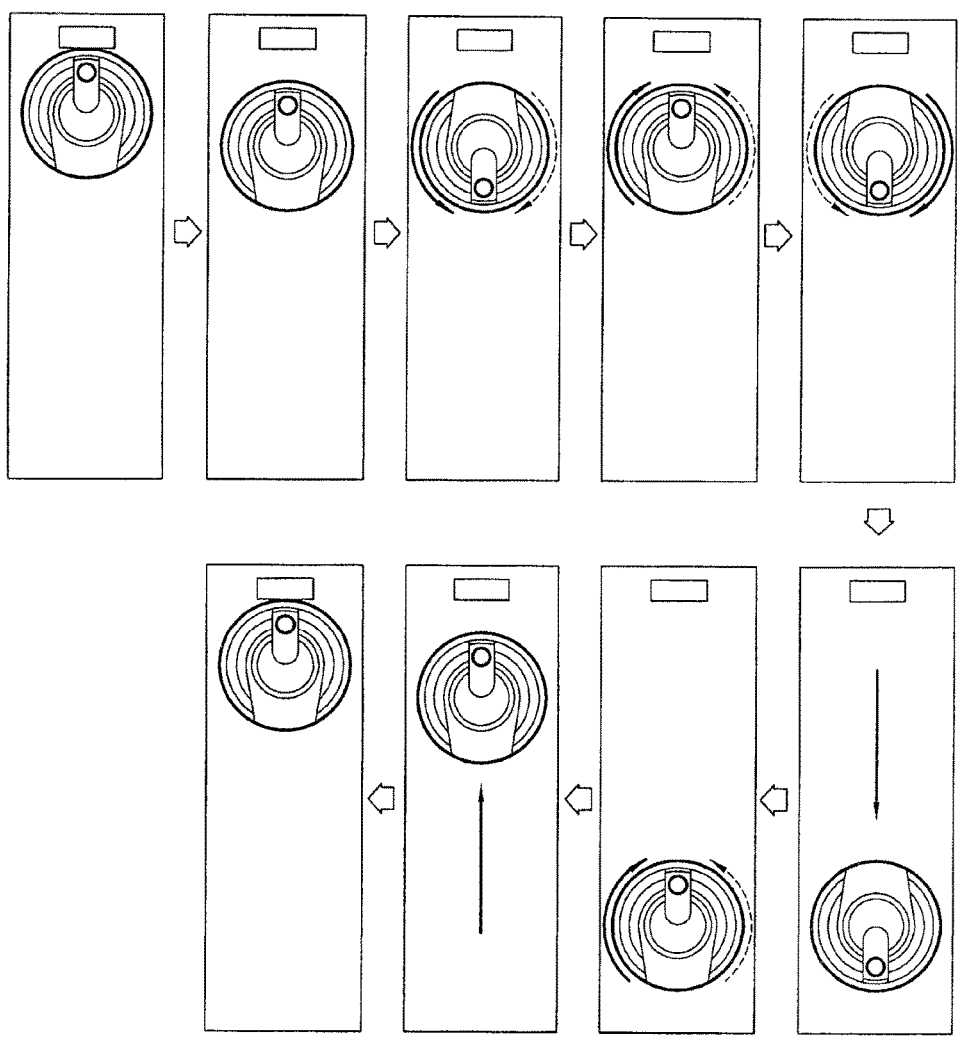
FIG. 19 is a view showing a pattern of a self test mode according to one embodiment of the present disclosure.

FIG. 19 is a view showing a pattern of a self test mode. In a charging mode, the robot cleaner receives an execution command with respect to a self test mode. If the current conditions of the robot cleaner satisfy preset execution conditions, the robot cleaner backward moves to be detached from the charging base. The robot cleaner tests whether an external signal sensor is in an abnormal state based on whether a guide signal generated from the charging base has been received or not. The robot cleaner may continuously test whether the external signal sensor is in an abnormal state or not, after being detached from the charging base. With rotating by 180° to the right or left direction, the robot cleaner may sense a rotation angle thereof by using a gyro sensor, and may sense an object by using a front sensor. This may allow the robot cleaner to test the gyro sensor and the front sensor. With rotating to the original position, the robot cleaner may test again the gyro sensor and the front sensor. After completing the self test, the robot cleaner moves by a predetermined distance in an opposite direction to the charging base. Here, the robot cleaner tests states of other sensors mounted therein. For instance, the robot cleaner may test an obstacle sensor by transmitting or receiving an infrared ray signal. And, the robot cleaner may test a state of a main wheel, e.g., whether right and left main wheels are in a balanced state, by sensing RPMs of the right and left main wheels with using a wheel sensor. The robot cleaner tests a cliff sensor, a lower camera sensor, etc. installed on a bottom surface of the body, and tests an acceleration sensor based on a speed change. The robot cleaner may test a driving unit or a cleaning unit by sensing a current, a rotation speed, etc. of each motor which constitutes the driving unit or the cleaning unit.

Once the self test mode has been completely executed, the robot cleaner may output a voice message such as "A test mode has been completed.". Alternatively, the robot cleaner may display the message on a screen. And, the robot cleaner provides an execution result, such as "No problem has been found as a test result." through an output unit in the form of sound, or provides the execution result on a screen (S150, S250). The robot cleaner may further provide a voice message, such as "Please press a charging button if you want to hear a test result again." or "Please press a stop button if you want to complete the self test.". Then, once a release command with respect to a test mode is input, the robot cleaner outputs a message, "The test mode will be released.".

If the current conditions of the robot cleaner do not satisfy preset execution conditions, of if it is determined that the operation sensing unit is in an abnormal state in a self test mode, the robot cleaner outputs an error message through the output unit (S151, S251). For instance, the robot cleaner outputs error messages, such as "Sensors are in an abnormal state.", "Problems have been found.", "A charging operation is not attempted.", "Please try to execute a test mode after turning off a main power switch disposed at a lower part of the body, and then turning on.", "Please clean windows of sensors.", "Please call the service center.", etc.

As aforementioned, in the robot cleaner and the self testing method thereof according to the present disclosure, the robot cleaner performs a self test when being initially operated or when required by a user. This may prevent malfunctions or breakdowns of the robot cleaner. Furthermore, in the present disclosure, the robot cleaner senses a state of the operation sensing unit provided at the body, based on a sensing signal of the operation sensing unit. This may prevent accidents or errors which may occur as the robot cleaner operates.

What is claimed is:
1. A robotic cleaner, comprising:
a body which forms an appearance;
a driving unit having a wheel motor to rotate a main wheel, and to move the body by driving the wheel motor;
a storage unit to store a test algorithm corresponding to a self-test mode;
an object sensing unit to sense periphery objects from the robotic cleaner;
an operation sensing unit to sense an operation of the robotic cleaner which changes according to a movement of the body, and to output sensing information;
a controller to execute the test algorithm to determine whether the operation sensing unit and the driving unit are in an abnormal state or not using the sensing information;

and an output unit to output a test result of the operation sensing unit, wherein the controller is configured to determine whether current states of the robotic cleaner satisfy a predetermined execution conditions, wherein the controller is configured to control the output unit to output a predetermined message comprising a guide information related to a surrounding of a charging base to guide a user to put objects within a predetermined distance away, wherein the controller is configured to control the robotic cleaner to move in a predetermined pattern according to the test algorithm such that the robotic cleaner backward moves to be detached from the charging base, or rotates at a position detaching from the charging base, or moves by a predetermined distance in and opposite direction to the charging base, when the robotic cleaner enters in the self-test mode, and wherein the operation sensing unit includes a gyro sensor to sense a rotation direction and a rotation angle of the robotic cleaner according to a rotation of the body, an acceleration sensor to sense a speed change of the robotic cleaner according to a movement of the body, and a camera sensor to output image data by capturing a floor surface, wherein the controller compares a rotation angle calculated using an output value of the wheel sensors with a rotation angle outputted from the gyro sensor when the robotic cleaner rotates a predetermined angle using a reference position according to the test algorithm, wherein the controller determines that the gyro sensor is in an abnormal state when there is a difference between the output value of the wheel sensors and the rotation angle outputted from the gyro sensor.

2. The robotic cleaner of claim 1, further comprising an input unit to input an execution command with respect to the self-test mode,
wherein the controller executes the test algorithm according to the execution command, and to test a state of the operation sensing unit.

3. The robotic cleaner of claim 1, wherein the operation sensing unit further includes a wheel sensor connected to the main wheel to sense an RPM of the main wheel.

4. The robotic cleaner of claim 3, wherein the controller compares the rotation angle sensed by the gyro sensor, with a rotation angle calculated using the RPM sensed by the wheel sensor, and tests whether the gyro sensor is in an abnormal state based on a comparison result.

5. The robotic cleaner of claim 3, wherein the controller recognizes a position of the robotic cleaner, using the rotation direction and the rotation angle sensed by the gyro sensor, or based on the RPM sensed by the wheel sensor.

6. The robotic cleaner of claim 1, further comprising right and left wheel sensors, and the main wheel includes right and left main wheels, wherein the controller compares RPMs of the right and the left main wheels with each other, the RPMs sensed by the right and the left wheel sensors while the robotic cleaner moves straight, and tests whether the right and the left main wheels are in an abnormal state using a comparison result.

7. The robotic cleaner of claim 1, wherein if an output value from the acceleration sensor is more than a reference value in the self-test mode, the controller determines that the acceleration sensor is in an abnormal state.

8. The robotic cleaner of claim 1, wherein the controller checks one or more preset execution conditions before executing the self-test mode.

9. The robotic cleaner of claim 8, wherein the one or more preset execution conditions indicate one of a mounted state of a dust box, an attached state of a dustcloth plate and a battery state, or a combination thereof.

10. The robotic cleaner of claim 1, wherein the operation sensing unit includes a camera sensor to output image data by capturing a floor surface, and
wherein if an output value from the camera sensor is less than a reference value or is out of a predetermined range in the self-test mode, the controller determines that the camera sensor is in an abnormal state.

11. The robotic cleaner of claim 10, wherein the controller recognizes a position of the robotic cleaner using the image data outputted from the camera sensor.

12. The robotic cleaner of claim 10, further comprising a cleaning unit installed at the body to suck dust particles into the cleaning unit.

13. The robotic cleaner of claim 1, wherein the object sensing unit includes an external signal sensor to receive a guide signal generated from a charging base, and
wherein if a sensing frequency by the external signal sensor is more than a reference value in the self-test mode, the controller determines that the external signal sensor is in a normal state.

14. The robotic cleaner of claim 1, wherein the object sensing unit includes an obstacle sensor to sense an obstacle using a signal emitted therefrom and received after reflection, and wherein if an output value from the obstacle sensor is more than a reference value in the self-test mode, the controller determines that the obstacle sensor is in an abnormal state.

15. The robotic cleaner of claim 1, wherein the object sensing unit includes a cliff sensor to sense a cliff using a signal emitted therefrom toward a floor surface and received after reflection, and wherein if an output value from the cliff sensor is more than a reference value in the self-test mode, the controller determines that the cliff sensor is in an abnormal state.

16. The robotic cleaner of claim 1, wherein the object sensing unit includes a camera sensor to output image data by capturing a floor surface, and
wherein if an output value from the camera sensor is less than a reference value or out of a reference range in the self-test mode, the controller determines that the camera sensor is in an abnormal state.

17. The robotic cleaner of claim 16, wherein the controller recognizes a position of the robotic cleaner using the image data outputted from the camera sensor.

18. The robotic cleaner of claim 1, wherein the controller checks one or more preset execution conditions before executing the self-test mode.

19. The robotic cleaner of claim 18, wherein the one or more preset execution conditions indicate one of a mounted state of a dust box, an attached state of a dust cloth plate and a battery state, or a combination thereof.

20. The robotic cleaner of claim 1, wherein the controller is configured to execute the self-test mode only when a current operation mode corresponds to a charging mode.

* * * * *